United States Patent [19]

McKelvey

[11] Patent Number: 4,601,772
[45] Date of Patent: Jul. 22, 1986

[54] APPARATUS FOR PRODUCING LAMINATED SAFETY GLASS

[75] Inventor: Harold E. McKelvey, Farmington Hills, Mich.

[73] Assignee: Shatterproof Glass Corporation, Detroit, Mich.

[21] Appl. No.: 700,135

[22] Filed: Feb. 11, 1985

[51] Int. Cl.$^4$ .............................................. B32B 31/24
[52] U.S. Cl. .................................. 156/382; 156/104; 156/106; 156/499; 312/236
[58] Field of Search ................. 65/118; 156/104, 106, 156/109, 382, 499; 312/236; 426/412, 523

[56] References Cited

U.S. PATENT DOCUMENTS

| | | | |
|---|---|---|---|
| 3,074,838 | 1/1963 | Little | 156/382 X |
| 3,281,297 | 10/1966 | Schmidt | 156/106 |
| 3,347,723 | 10/1967 | Hill | 156/104 X |
| 3,817,811 | 6/1974 | Halberschmidt et al. | 156/382 |
| 3,852,136 | 12/1974 | Plumat et al. | 156/382 X |
| 3,971,668 | 7/1976 | Pickard et al. | 156/104 |
| 4,164,590 | 8/1979 | Mencacci | 426/412 X |
| 4,431,471 | 2/1984 | Mertens et al. | 156/104 X |

Primary Examiner—Robert A. Dawson
Attorney, Agent, or Firm—Burton, Parker & Schramm

[57] ABSTRACT

For use in the prepressing of laminated safety glass in which glass-plastic assemblies are sealed in individual plastic bags, a rectangular heating oven having a bottom wall provided with a longitudinally extending slot, a plurality of portable racks, each rack being provided with a solid base operating slot in the bottom wall of the oven and with a plurality of horizontal shelves positioned in spaced relation one above the other for supporting individual assemblies, the shelves being pivotally mounted and movable to a vertically inclined position to permit the placement of one of the assemblies on the next lower shelf or its removal therefrom. Each rack is provided with means for creating a vacuum in the associated plastic bags to withdraw the air therefrom as well as from between the laminations. Means are also included for advancing the racks through the oven in end-to-end abutting relation to close the slot and provide a substantially closed heating chamber in the oven.

8 Claims, 12 Drawing Figures

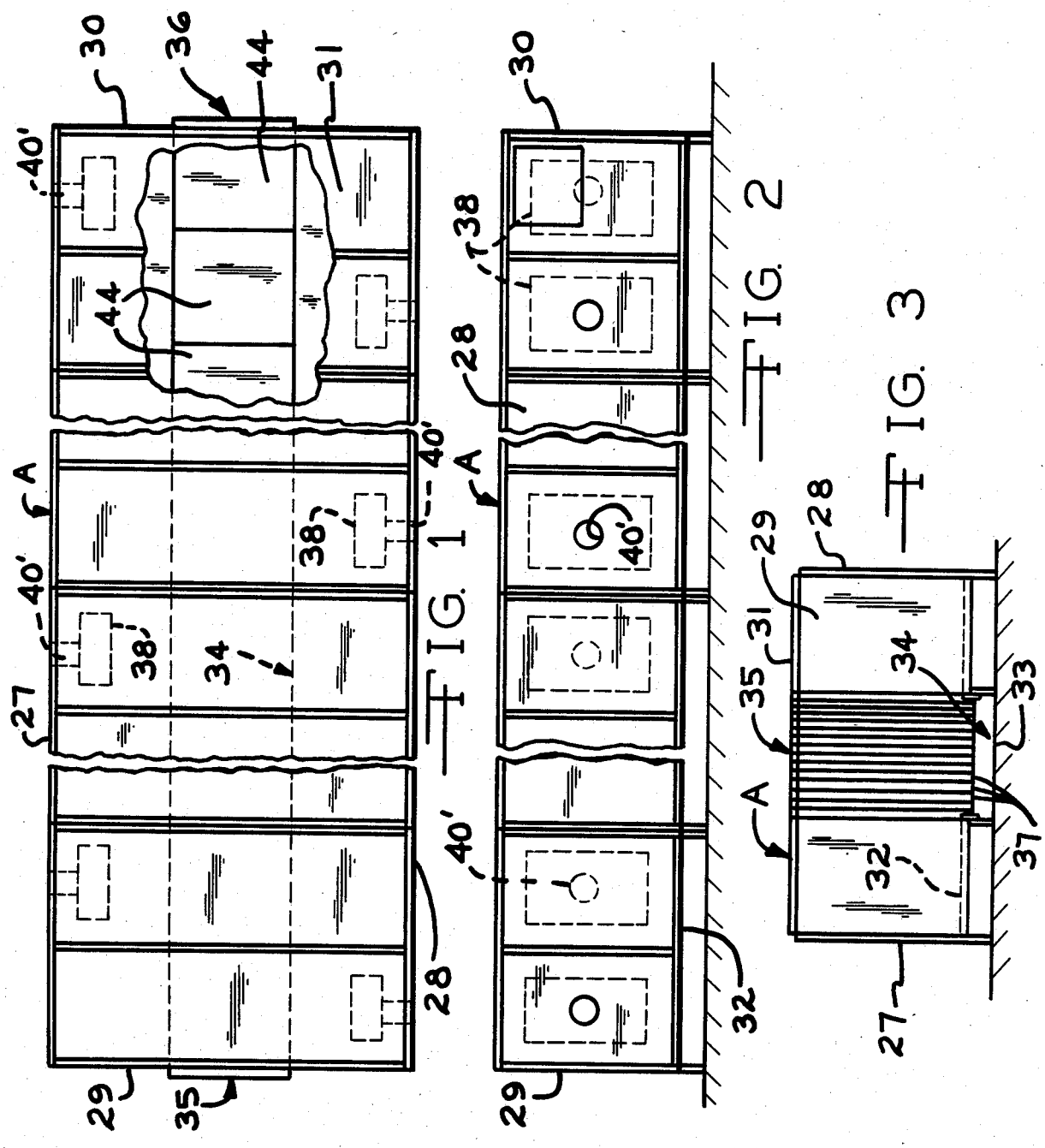

APPARATUS FOR PRODUCING LAMINATED SAFETY GLASS

FIELD OF THE INVENTION

The present invention relates to improved apparatus for use in the production of laminated safety glass and, in particular, laminated automobile windshields, and the like.

BACKGROUND OF THE INVENTION

Automobile windshields ordinarily consist of two sheets of glass and an interposed layer of a thermoplastic material, such as polyvinyl butyral, bonded to one another by heat and pressure to form a composite unit. The bonding is usually accomplished in a two-step operation by first subjecting the assembled laminations to a preliminary pressing to remove the air from between the laminations and effect superficial bonding thereof, and then to a final heating and pressing operation in an autoclave filled with oil or air to completely bond the laminations together.

Different methods have been employed for initially removing the air from between the laminations. One of these consists in passing the glass-plastic assembly between squeeze rollers to force the entrapped air from between the laminations. Another is to provide a flexible channel shaped member in engagement with the marginal edge portion only of the assembly, in spaced relation to at least part of the periphery thereof, to provide a conduit through which the air can be withdrawn. Still another is to place the assembly in a flexible plastic bag, seal the bag, and apply a vacuum thereto to withdraw air from within the bag as well as from between the laminations. These bags are usually formed of films or sheets of polyvinyl alcohol.

OUTLINE OF THE INVENTION

This invention is concerned with the so-called bagging method and has for its primary object the provision of improved apparatus for effecting the preliminary pressing of the glass-plastic assemblies preparatory to final compositing.

Another object of the invention is to provide an apparatus of the above character embodying a horizontally elongated heating oven and support racks for carrying the glass-plastic assemblies through said oven, characterized in that the heating oven and support racks are of novel construction, combination and arrangement to more effectively and efficiently perform the preliminary pressing operation.

Another object of the invention is to provide support racks of novel construction for supporting a plurality of glass-plastic assemblies under individual vacuum while being advanced through the heating oven.

A further object of the invention is to provide apparatus in which the heating oven and glass-plastic assembly support racks cooperate with one another to provide a substantially closed heating chamber through which the racks move.

BRIEF DESCRIPTION OF THE DRAWING

FIG. 1 is a top plan view of a heating oven constructed in accordance with the invention, FIG. 2 is a side view of the heating oven, FIG. 3 is an end view of the heating oven.

DETAILED DESCRIPTION

Figure 1A:
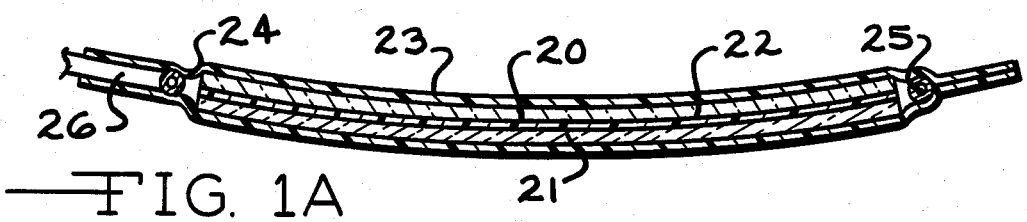
FIG. 1A is a sectional view of a glass-plastic assembly.

Referring in detail to the drawings and particularly to FIG. 1A, there is illustrated, by way of example, a glass-plastic assembly representing an automobile windshield and composed of two sheets of glass 20 and 21 and an interposed layer 22 of a thermoplastic material, such as polyvinyl butyral.

The three laminations 20, 21 and 22 are assembled by laying them freely one upon the other to form a sandwich which is then placed in a plastic vacuum bag 23 and the bag sealed. Prior to sealing, however, a vacuum hose 24 is arranged around the periphery of the sandwich in spaced relation thereto. The hose 24 is provided with a series of openings 25 and is connected to a source of vacuum through an outlet hose 26, as will be later described.

According to the invention, after the sandwich or glassplastic assembly has been placed in the bag and the bag sealed, the bag is placed, along with others, on a support rack and passed through a horizontally elongated heating oven to effect a preliminary bonding of the laminations.

Figure 5:
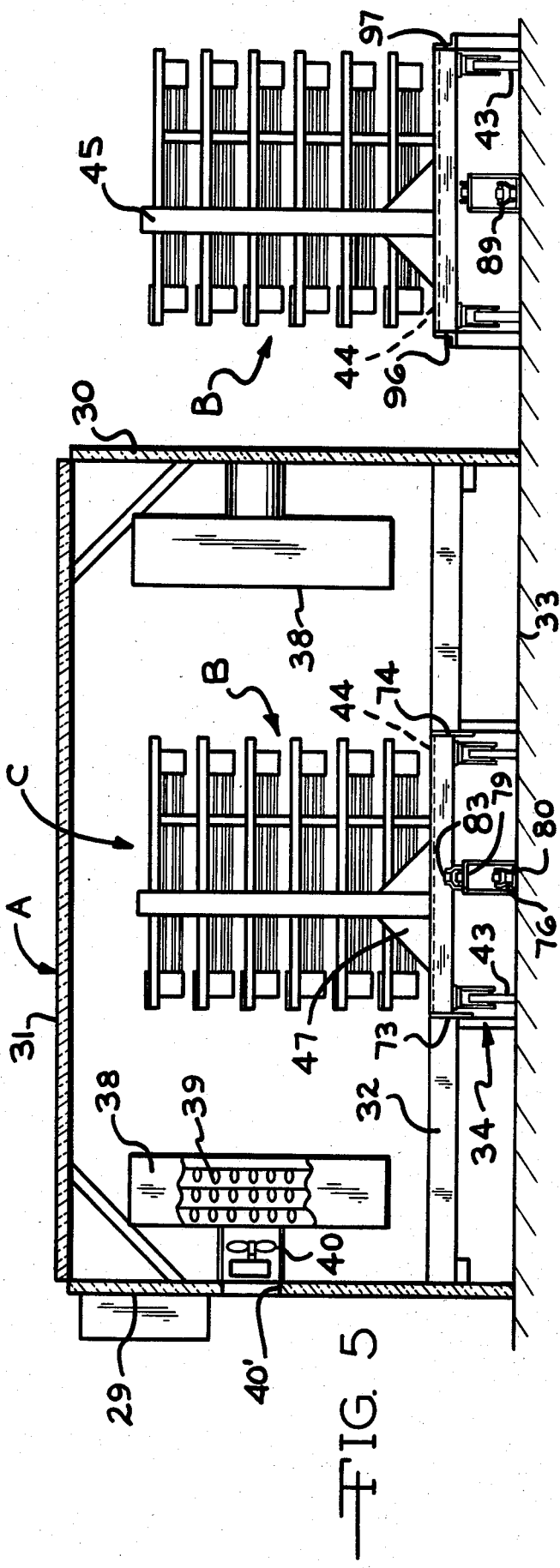
FIG. 5 is a transverse section taken substantially on line 5—5 of FIG. 4.

The heating oven is generally designated by the letter A in FIGS. 1, 2 and 3 and is composed of side walls 27 and 28, end walls 29 and 30, a top wall 31 and a bottom wall 32 which define the oven chamber. As shown in FIGS. 3 and 5, the bottom wall 32 of the oven is spaced above the support floor 33 and is provided midway between the side walls 27 and 28 with a longitudinally extending slot 34 that extends throughout the length of the oven. The end walls 29 and 30 are provided with vertical openings 35 and 36 that register with the slot 32 in the bottom wall and constitute the entrance and exit openings respectively of the oven. These openings are normally closed by suitable closure means, such as flexible vertical strips 37 (FIG. 3) of plastic, rubber, or the like, which permit passage of the racks carrying the glass-plastic assemblies therethrough.

The oven A may be heated in any desired manner such as by steam heaters 38 positioned in alternate relation along the opposite side walls 27 and 28. Each heater includes a radiator 39 and an electric fan 40 for distributing the heat within the oven chamber. Posts 40' are provided in the side walls of the oven to facilitate cooling of the electric fans 40.

A plurality of racks B, carrying the glass-plastic assemblies to be prepressed, are successively introduced into the heating oven A through the entrance opening 35 thereof and discharged therefrom through the exit opening 36. During travel through the oven the plastic interlayers 22 of the assemblies will be subjected to a temperature sufficient to bring about a softening of the thermoplastic interlayers and superficial bonding of said interlayers to the glass sheets.

Figure 6:
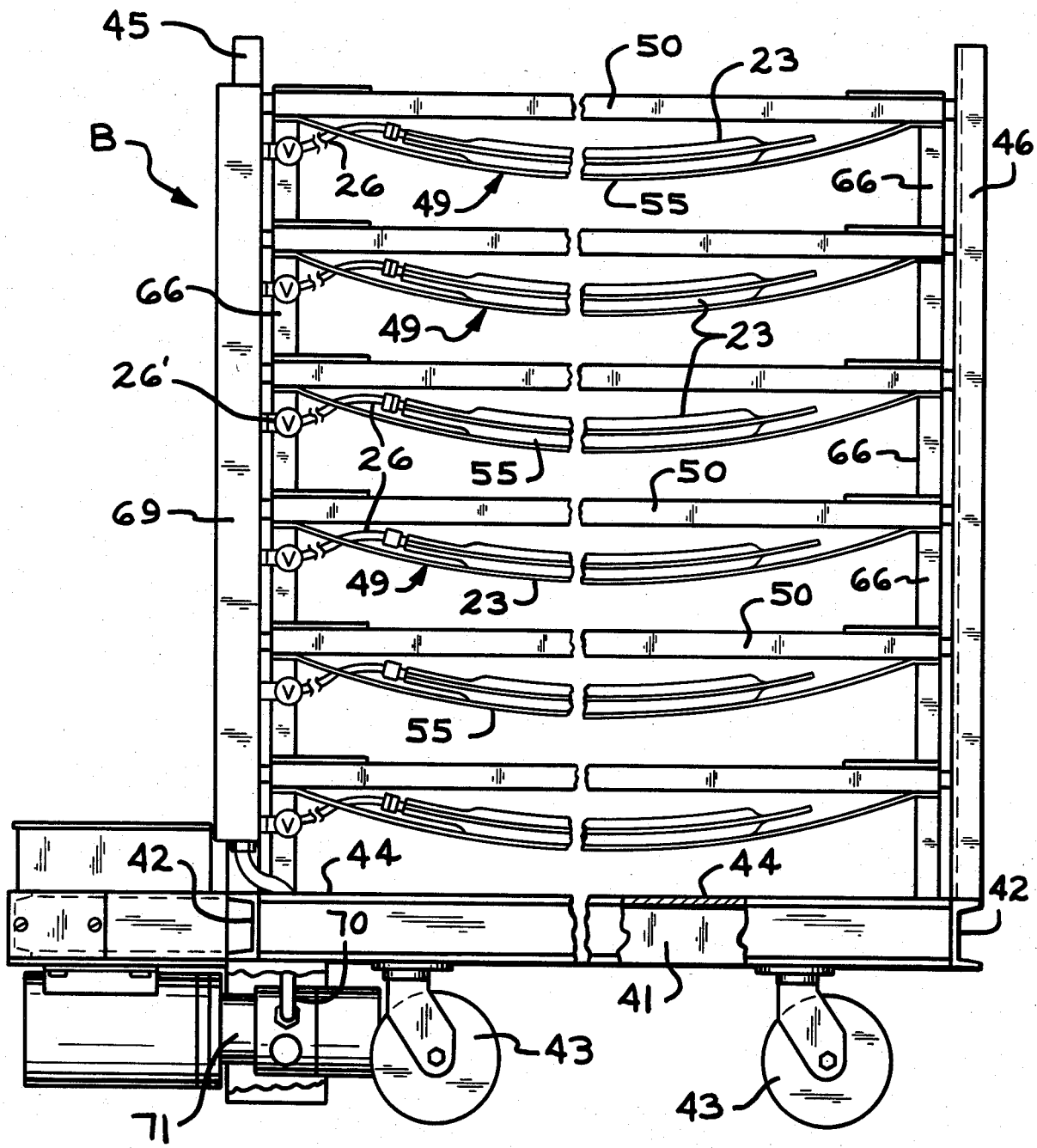
FIG. 6 is a side view of one of the support racks constructed in accordance with the invention.
Figure 4:
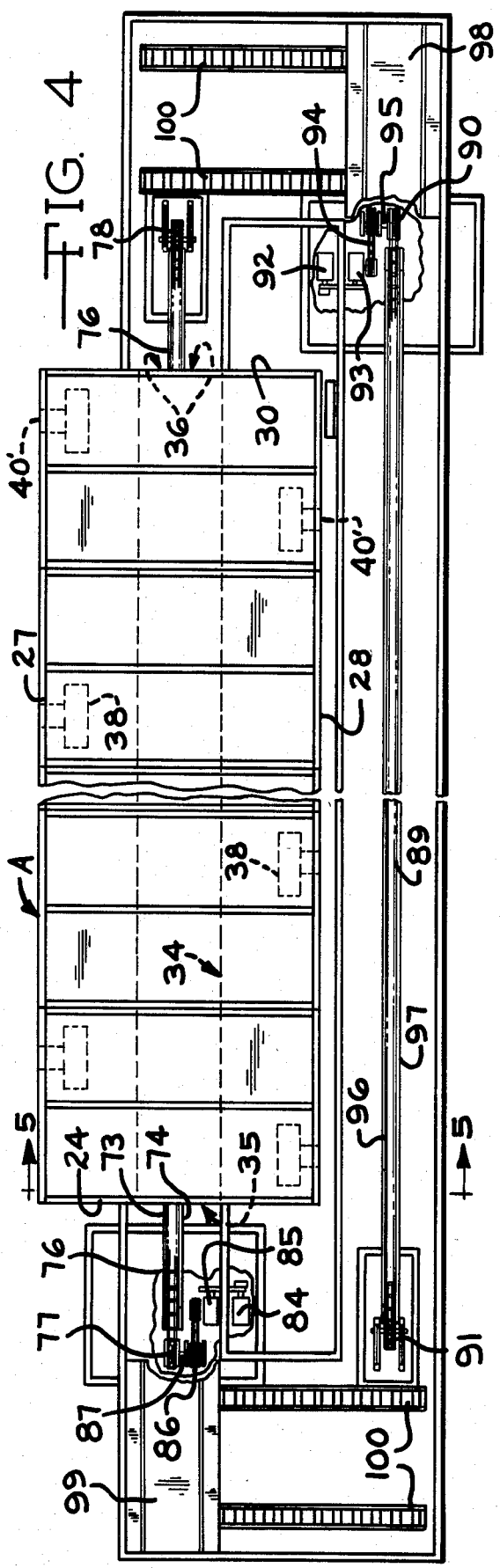
FIG. 4 is a plan view of the heating oven including the means for advancing the support racks therethrough.

Each of the racks B (FIGS. 6 and &) comprises a horizontal base consisting of a rectangular supporting framework made up of side and end channel members 41 and 42 respectively supported by swivelled casters 43 at the four corners thereof. Carried by the supporting framework is a solid floor 44 which completes the base or bottom of the rack.

Supported by the end channel members 42 are vertical standards 45 and 46 which are secured to said channels by bracket plates 47 and 48 respectively. The standards 45 and 46 are positioned in alignment with one another but are offset with reference to the transverse center line of the rack (FIG. 7) for a purpose to be more fully hereinafter explained.

Figure 8:
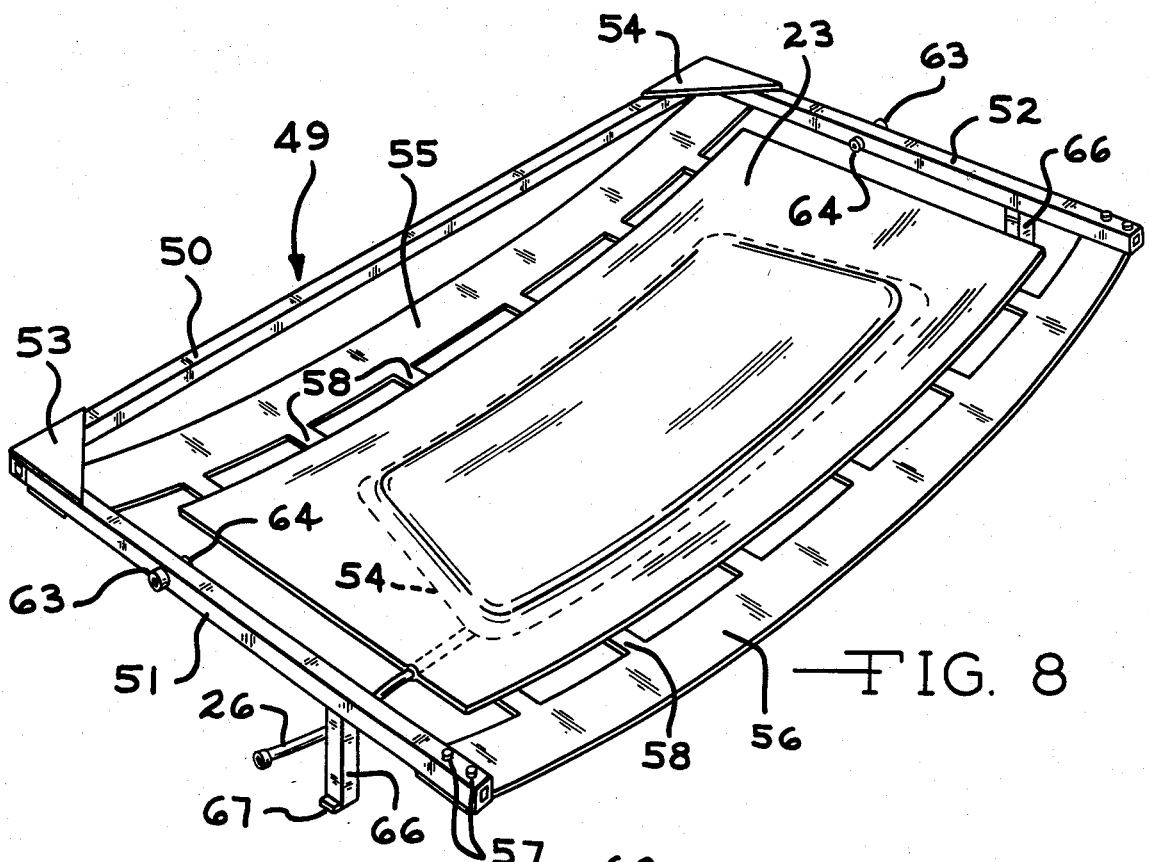
FIG. 8 is a perspective view of one of the assembly support shelves.

Each rack is also provided with a plurality of horizontal shelves 49 positioned one above the other, each shelf being adapted to support one of the glass-plastic assemblies to be processed. While six shelves are shown, any desired number may be provided. As illustrated in FIG. 8 each shelf is made up of a three sided frame composed of a side member 50 and transverse end members 51 and 52 secured to said side member by gussets 53 and 54. Extending between the end members 51 and 52 are metal bands 55 and 56 secured to said end members 51 and 52 by bolts or the like 57. Formed integral with the bands 55 and 56 are the spaced transverse strips 58 which form, with the bands 55 and 56, a metallic grid on which a glass-plastic assembly is freely supported. The grid is concavely curved to the same or approximately the same curvature as the assembly supported thereon.

Figure 9:
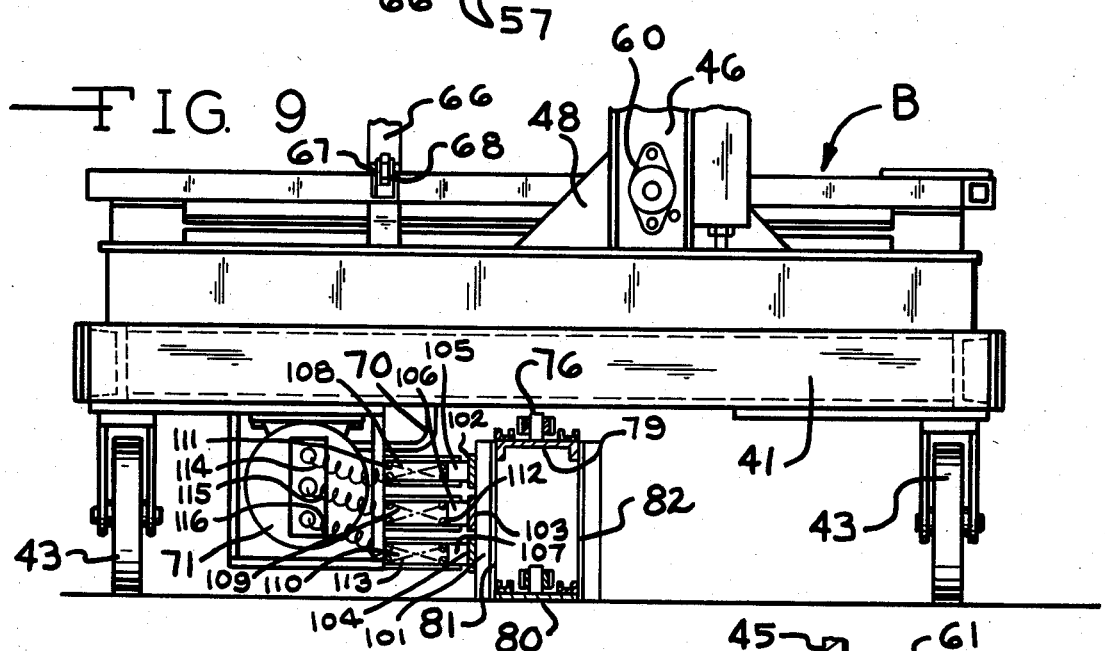
FIG. 9 is an end view of a portion of the rack and the means for moving the same through the heating oven.
Figure 11:
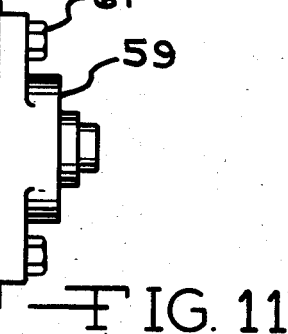
FIG. 11 is a detail section taken substantially on line 11—11 of FIG. 7.

The shelves 49 are pivotally carried by the vertical standards 45 and 46 and for this purpose there are secured to the opposite end members 51 and 52 of each shelf brackets 59 and 60 (FIGS. 9 and 11) by screws or the like 61. Passing through each bracket and associated end member 51 or 52 is a stub shaft 62. The standards 45 and 46 are spaced from the respective end member 51 of the shelf by a sleeve 63 and secured by a collar 64. The stub shafts 62 at opposite ends of the shelf are aligned with one another but are offset with reference to the transverse center line of the shelf so that the shelf will normally fall to a horizontal position as shown in full lines in FIG. 7 where it will be supported by the vertical legs 66 carried by the end members 51 and 52 and which engage the corresponding end members of the next lower shelf.

Figure 10:
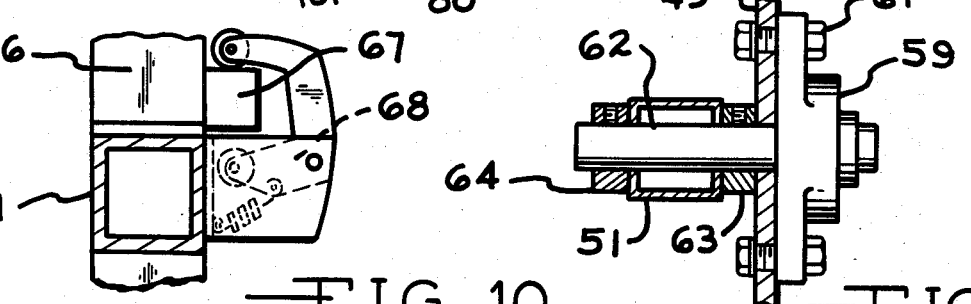
FIG. 10 is a detail view of one of the spring latches.

When the shelf assumes its horizontal position, a foot 67 at the lower end of each leg 66 will engage a conventional spring latch 68 carried by the next lower shelf which will maintain the shelf in secured position until released. (FIG. 10)

Figure 7:
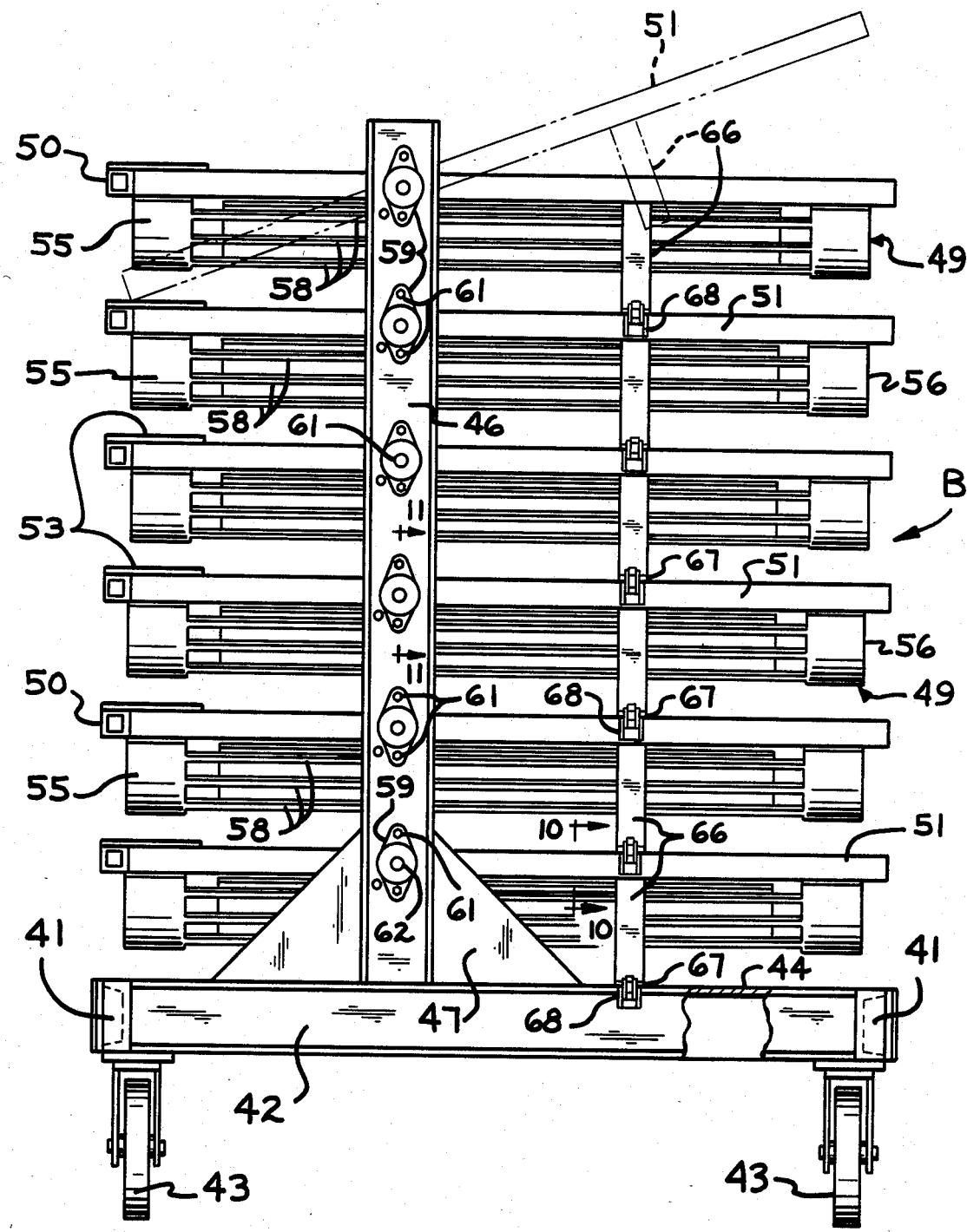
FIG. 7 is an end view of the support rack.

When it is desired to place one of the glass-plastic assemblies on a given shelf or remove it therefrom the shelf immediately above the shelf to be loaded or unloaded is released from its associated spring latches 68 and swung upwardly about the stub shafts 62, as indicated in broken lines in FIG. 7. In other words, to place one of the assemblies on a given shelf or remove it therefrom the next higher shelf is swung upwardly to provide access to the shelf immediately therebeneath.

After a rack has been loaded with the desired number of assemblies, the hoses 26 leading from the plastic bags 23 are each connected to a manifold 69 mounted vertically at one side of the rack. The manifold is connected at its lower end by a pipe 70 to a motor 71 upon operation of which a vacuum will be created in the associated plastic bags to withdraw the air therefrom as well as from between the laminations. While maintaining the vacuum, the rack is advanced through the heating oven during which the assemblies are heated to a temperature sufficient to soften the plastic interlayers and cause them to adhere to the glass sheets. The vacuum in the bags is controlled by an individual valve 26' in each hose 26. The oven is heated to a temperature of about 250° F. to about 350° F. and the racks remain in the oven from about seven to ten minutes.

As illustrated in FIG. 5, the bottom wall 32 of the heating oven is spaced above the oven support floor 33 so that the floor 44 of each rack is substantially in line therewith and rides along the side rails 73 and 74. Thus, the bottoms of the racks are received in the slot in the bottom wall of the oven and when the racks are moved through the oven in end-to-end abutting relation as indicated in FIG. 1, they completely close the slot 34 and cooperate with the bottom wall 32 of the oven to provide a substantially closed heating chamber C therein. This is an important aspect of the invention in that it permits the vacuum motors 71 to be operated at a much lower temperature than would otherwise be the case. It is for this reason that the vacuum motors are located beneath the bottom wall of the oven and hence protected from the high heat in the oven chamber. If this protection were not provided the operating life of the motors would be materially reduced. As stated above, the temperature within the oven chamber is maintained in the range of 250° F. to 350° F. On the other hand, the vacuum motors are preferably not operated at a temperature much in excess of 150° F. Thus, their operating life is greatly increased.

As previously stated, the vacuum on the laminated assemblies is maintained during the entire time the racks remain in the heating oven. To accomplish this, means is provided for supplying electrical energy to the motors 71 as the racks enter the oven and for shutting off the motors as the racks leave the oven. Such means includes a panel 101 positioned along side of the sprocket chain 76 and on which are mounted the three parallel bus bars 102, 103 and 104 that extend the length of the oven. Rolling contacts 105, 106 and 107 engage the bus bars 102, 103 and 104 respectively. The contacts are contained in casings 108, 109 and 110 and are backed-up by springs 111, 112 and 113 respectively that maintain the associated contacts in engagement with the bus bars. Electrical energy is transmitted from the bus bars 102, 103 and 104 to the motor 71 through the wire connections 114, 115 and 116 respectively. The motor 71 on each rack is automatically placed in operation as the contacts engage the bus bars to initiate the vacuum on the laminated assemblies and is automatically shut-off as the contacts pass beyond the bus bars as the rack leaves the oven to discontinue the vacuum.

A plurality of racks B carrying glass-plastic assemblies to be prepressed are successively introduced into the entrance end of the heating oven and advanced therethrough in end-to-end abutting relation by an endless sprocket chain 76 extending lengthwise of the oven and somewhat beyond the opposite ends thereof. The sprocket chain 76 is located beneath the floor of the heating oven (FIG. 5) in line with the slot therein and is trained at the opposite ends of its loop about sprockets 77 and 78. The upper and lower flights of the sprocket chain ride along rails 79 and 80 respectively. Attached to the sprocket chain 76 at intervals along its length are pusher blocks or the like 83 that engage successive racks and advance them into and through the oven in timed relations to the racks leaving the exit end thereof.

The sprocket chain 76 is driven by a motor 84 through a gear reduction unit 85 and a chain and sprocket drive means 86 which includes a drive shaft 87 connected to the sprocket 77. The sprocket 78 at the exit end of the oven is an idler sprocket.

Arranged along one side of the heating oven and parallel with the sprocket chain 76 is a second sprocket chain 89 for returning the racks to the entrance end of the oven. The return sprocket chain 89 is trained at the opposite ends of its loop about sprockets 90 and 91 and is driven from a motor 92 through a gear reduction unit 93 and chain and sprocket means 94 including a drive shaft 95 connected to sprocket 90. The sprocket 91 is an idler sprocket. Pusher blocks, similar to pusher blocks 83, are also provided on the return sprocket chain 89 for advancing the racks forwardly during which travel they are guided by the side rails 96 and 97 (FIG. 5). During the return travel of the racks to the entrance end of the oven the prepressed glass-plastic assemblies are permitted to cool before being removed.

Located at the exit end of the heating oven is a transfer means including a pallet 98 for receiving the racks from the oven and for transferring them to a position in line with the return sprocket chain 89. Positioned at the opposite or entrance end of the oven is a second transfer means including a pallet 99 for receiving the racks from the return sprocket chain 89 and transferring them to a position in line with the entrance end of the oven. The pallets 98 and 99 are each supported upon and moved transversely between their two positions by two series of rollers 100. The movement of the pallets along the rollers may be accomplished manually or by any suitable mechanical means.

In practice, loaded racks, positioned on the pallet 99 at the entrance end of the heating oven, are moved therefrom into the oven in timed relation to the removal of the racks from the exit end thereof onto the pallet 98. The bottoms of the racks are maintained in end-to-end abutting relation. Also, the bottoms of the racks are received in the slot 34 in the bottom wall of the oven, with the side edges thereof riding along the side rails 73 and 74. Upon leaving the heating oven the racks are transferred by the pallet 98 to a position in line with the sprocket chain 89 and returned to the entrance end of the oven where the prepressed glass-plastic assemblies are removed and the racks reloaded with assemblies to be prepressed.

While there has been illustrated and described a preferred embodiment of the invention, it will be understood that changes and modifications may be made without departing from the spirit or scope of the appended claims.

I claim:

1. Apparatus for use in the prepressing of laminated safety glass assemblies composed of two sheets of glass and an interposed layer of a thermoplastic material, in combination, a rectangular heating oven having a bottom wall provided with a longitudinally extending slot, means for heating said oven, a rack for supporting a plurality of laminated assemblies including a base received in said slot in the bottom wall of the oven and being of a width substantially equal to the width of said slot, and means for moving the rack through said oven.

2. Apparatus as claimed in claim 1, including a plurality of racks, and means engaging the racks for moving them through the oven in end-to-end abutting relation.

3. Apparatus as claimed in claim 1, in which the heating oven also includes spaced side walls and in which the slot in the bottom wall thereof is positioned substantially midway between said side walls, and including a plurality of racks, the bases of which are received in said slot and cooperate with the bottom wall of the oven to close the said slot.

4. Apparatus as claimed in claim 3, including means engaging the racks for moving them through said oven in end-to-end abutting rela- tion.

5. Apparatus as claimed in claim 3, in which the width of the bases of the racks is substantially the same as the width of the slot, and including means for moving the racks through the oven in end-to-end abutting relation such that the racks cooperate with the bottom wall of the oven to provide a substantially closed heating chamber therein.

6. Apparatus for use in the preparation of laminated safety glass assemblies composed of two sheets of glass and an interposed layer of thermoplastic material encased in a sealed plastic bag, comprising a substantially rectangular heating oven, having a bottom wall provided with a longitudinally extending slot, a rack including a base operating in said slot and provided with a plurality of horizontal shelves arranged in vertically spaced relation for supporting individual laminated assemblies, a vacuum manifold carried by the rack, vacuum connections between the manifold and the individual plastic bags containing the safety glass assemblies, means for creating a vacuum in the manifold to withdraw the air from within the individual bags, and means for moving the rack through the heating oven.

7. Apparatus as claimed in claim 6, in which the means for creating a vacuum in the manifold and the means for moving the rack through the heating oven are located beneath the bottom wall of said oven.

8. Apparatus as claimed in claim 6, in which the means for creating a vacuum in the manifold comprises a motor carried by the rack beneath the bottom wall of the heating oven.

* * * * *

UNITED STATES PATENT AND TRADEMARK OFFICE
CERTIFICATE OF CORRECTION

PATENT NO. : 4,601,772

DATED : July 22, 1986

INVENTOR(S) : Harold E. McKelvey

It is certified that error appears in the above-identified patent and that said Letters Patent is hereby corrected as shown below:

In column 6, line 26, change "rela- tion" to ---relation---.

In column 6, line 34, change "preparation" to ---prepressing---.

Signed and Sealed this

Seventh Day of October, 1986

[SEAL]

Attest:

DONALD J. QUIGG

Attesting Officer

Commissioner of Patents and Trademarks